United States Patent [19]
Earnest

[11] Patent Number: 5,982,837
[45] Date of Patent: Nov. 9, 1999

[54] AUTOMATIC BAUD RATE DETECTOR

[75] Inventor: Tim Earnest, Vadnais Heights, Minn.

[73] Assignee: LSI Logic Corporation, Milpitas, Calif.

[21] Appl. No.: 08/876,208

[22] Filed: Jun. 16, 1997

[51] Int. Cl.$^6$ ...................................................... H04B 1/66
[52] U.S. Cl. ................................................................ 375/377
[58] Field of Search ..................................... 375/377, 225; 370/465

[56] References Cited

U.S. PATENT DOCUMENTS

| | | | |
|---|---|---|---|
| 3,775,751 | 11/1973 | Anderson ................................. | 375/377 |
| 4,003,032 | 1/1977 | Austin et al. ............................ | 395/836 |
| 4,969,147 | 11/1990 | Markkula et al. ...................... | 370/474 |
| 5,008,902 | 4/1991 | Key et al. ................................ | 375/377 |
| 5,507,040 | 4/1996 | Eaton et al. ............................. | 455/343 |
| 5,561,693 | 10/1996 | Yung et al. .............................. | 375/377 |
| 5,724,389 | 3/1998 | Marko et al. ............................ | 375/340 |

Primary Examiner—Tesfaldet Bocure

[57] ABSTRACT

An automatic baud rate detector circuit includes a serial input, a counter, a register, a comparator and a state machine circuit. The serial input receives a serial data stream having a bit defined by a first transition from a first logic state to a second logic state and next subsequent second transition from the second logic state to the first logic state. A counter increments a sample count in response to a clock signal when a count enable signal supplied to the counter is active. A register coupled to the counter stores the sample count as a minimum count when a load control signal supplied to the counter is active. The comparator is coupled to the counter and the register and generates a compare signal which indicates whether the sample count is less than the minimum count. The state machine circuit is coupled to the serial input for receiving the serial data stream and supplies the count enable signal to the counter and the load enable signal to the register. The state machine circuit activates the count enable signal from the first transition to the second transition in the serial data stream and activates the load enable signal when the first compare signal indicates the sample count is less than the minimum count. After one or more cycles of the state machine circuit, the minimum count stored in the register can be used to calculate the baud rate of the serial data stream.

17 Claims, 4 Drawing Sheets

AUTOMATIC BAUD RATE DETECTOR

BACKGROUND OF THE INVENTION

The present invention relates to an automatic baud rate detector for use with a synchronous or asynchronous serial communications controller.

A serial communications controller controls the transmission and receipt of serial data streams to and from a remote device over a serial communications line. There are two types of serial communications controllers, synchronous and asynchronous. An asynchronous controller is known as a Universal Asynchronous Receiver/Transmitter (UART). An automatic baud rate detector allows a receiving device to accept data from a variety of transmitting devices operating at different speeds without establishing data rates in advance. The baud rate detector determines the speed and logic level of the incoming data stream by examining the first character, which is usually a predefined sign-on character.

For example, the sign-on character may include the eight-bit character 0x0D, which is transmitted with a leading start bit and a trailing, optional parity bit and one or two stop bits. The label "0x" indicates that "0D" is a hexadecimal value. The sequence of bit transmission begins with the start bit, which is followed by the sign-on character from the least significant bit (lsb) to the most significant bit (msb), the optional parity bit and then the one or two stop bits. Since most communications lines are tied to a logic high level when data is not being transmitted over the line, the start bit is typically a logic "0".

Automatic baud rate detection is typically performed by a software routine executed by a host processor that is associated with the receiving device. If the software routine has not previously detected the baud rate, the software routine waits for the user to press Enter (e.g. Carriage Return) and then transmits it as the sign-on character onto the serial output line through the serial communications controller. The software routine waits for the echoed sign-on character to return on the serial input line and then counts how long it takes for the bits of the sign-on character, including the start bit and the stop bits, to arrive on the serial input line. The software routine then calculates the baud rate that is required for transmitting the data to the remote device, stores the baud rate and initializes various transmit function registers in the serial communications controller to transmit at the required baud rate.

In one example, the software routine counts how long it takes for the sign-on character to arrive by reading the input data stream and waiting for it to transition to a logic low level, which is assumed to be the start bit. A timer is started when the serial data stream transitions to a logic high level again with the lsb of the sign-on character. The software routine waits for the remaining bit transitions in the sign-on character and stops the timer at the beginning of the first stop bit. The timer value indicates how many clock cycles passed while the software routine waited for the eight data bits plus the optional parity bit.

A disadvantage of this method of automatic baud rate detection is that the software routine requires a large overhead and thus consumes valuable processing time while the host processor monitors the activity on the serial input line. The host processor is typically dedicated to this function, and must continually wait for the stop bit to arrive and then take immediate action to stop the timer and calculate the baud rate.

Another disadvantage of this method of baud rate detection is that it introduces error into the baud rate calculation, which limits the maximum baud rate it can accurately detect. Most communication systems can tolerate a baud rate error of about three percent without incurring communication problems. With the method discussed above, the host processor must execute three or more instructions once the stop bit has arrived in order to turn off the timer. This introduces an error of several clock cycles into the timer value. The optional parity bit at the end of the sign-on character is an additional source of errors. Since the host processor does not know whether the remote device is transferring a parity bit, the baud rate calculations may be inaccurate if the software routine does not divide the timer value by the correct number of bits. These sources of errors limit the baud rate detection to only about 19,200 baud without incurring a baud rate error above three percent.

SUMMARY OF THE INVENTION

The automatic baud rate detector circuit of the present invention includes a serial input, a counter, a register, a comparator and a state machine circuit. The serial input receives a serial data stream having a bit defined by a first transition from a first logic state to a second logic state and a second transition, which is the next subsequent transition, from the second logic state to the first logic state. A counter increments a sample count in response to a clock signal when a count enable signal supplied to the counter is active. A register coupled to the counter stores the sample count as a minimum count when a load control signal supplied to the counter is active. The comparator is coupled to the counter and the register and generates a compare signal which indicates whether the sample count is less than the minimum count. The state machine circuit is coupled to the serial input and supplies the count enable signal to the counter and the load enable signal to the register. The state machine circuit receives the serial data stream and activates the count enable signal from the first transition to the second transition and activates the load enable signal when the first compare signal indicates the sample count is less than the minimum count. The minimum count stored in the register can then be used with the clock rate to calculate the baud rate of the serial data stream.

In one embodiment of the present invention, the state machine circuit includes a synchronous logic circuit having a sequence of states, including a) supplying a counter reset signal to the counter that initializes the sample count, b) waiting for the first transition from the first logic state to the second logic state, c) activating the count enable signal when the first transition is detected, d) waiting for the second transition from the second logic state to the first logic state, e) deactivating the count enable signal when the second transition is detected, f) receiving the first compare signal from the first comparator, and g) activating the load enable signal if the first compare signal indicates the sample count is less than the minimum count, and wherein the state machine circuit then returns to state a).

In a preferred embodiment, the state machine circuit activates the load enable signal if the sample count is less than the minimum count, the sample count has not overflowed and the sample count is at least as great as a predetermined constant which corresponds to a baud rate that is greater than a maximum allowable baud rate. The predetermined constant essentially acts as a high-pass filter.

Another aspect of the present invention relates to a method of detecting baud rate. The method includes receiving a serial data stream having a bit with a first transition from a first logic state to a second logic state and a second transition, which is the next subsequent transition, from the second logic state to the first logic state. A clock signal is received having a plurality of cycles, with each cycle having a clock period. The number of clock cycles received between the first transition and the second transition are counted, and the baud rate of the serial data stream is calculated based on the number of counted clock cycles and the clock period.

DETAILED DESCRIPTION OF THE PREFERRED EMBODIMENTS

The automatic baud rate detector of the present invention determines the baud rate, or bit rate, of a digital serial input data stream by measuring the time duration that the data stream is low during exactly one bit period. A bit period is the time duration between the falling and rising edges of the bit.

Figure 1:
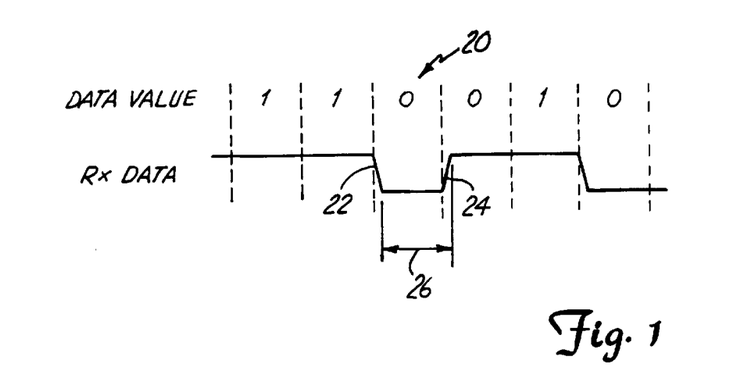
FIG. 1 is a diagram illustrating a serial data stream which is NRZI encoded.

FIG. 1 is a diagram illustrating a received data stream RxDATA which is Non-Return to Zero Inverted (NRZI) encoded. For NRZI encoded data streams, a change in logic states from one bit to the next represents a logic "0" and a lack of a change in logic states represents a logic "1". Logic "0" bit 20 has a falling edge 22, a rising edge 24 and a bit period 26. Bit period 26 is measured with a sample counter. The sample counter counts up from zero at the system clock rate, starting at falling edge 22. The sample counter is stopped when rising edge 24 is detected. The value of the sample counter at the time the counter is stopped represents the time duration that RxDATA was low during exactly one bit period. The value of the sample counter is then compared with an accumulated minimum count. If the sample count is found to be less than the minimum count, then the minimum count is replaced by the value of the sample counter. Since RxDATA can frequently be zero for several consecutive bits, the minimum count is accumulated over a period of time. After this period of time, RxDATA is guaranteed to have been low during exactly one bit period, and the corresponding sample count is the minimum count.

The baud rate is calculated according to Equation 1:

Baud Rate=1/(Minimum Count*Clock Period)    Eq. 1

For example, if the minimum count was 66,666 and the system clock frequency was 80 MHz, then the baud rate of the incoming data stream would be:

1/(66,666*12.5 nsec)=1200 Baud    Eq. 2

The baud rate detector of the present invention can also be used to detect the baud rates of other asynchronous data streams, such as non-return to zero (NRZ), frequency modulated "0" (FM0) and frequency modulated "1" (FM1) encoded data streams. For FM0 and FM1 encoded data streams, the time duration measurement is multiplied by two since the measurement is made on only half of a bit period. For example, with FM0 encoded data streams, a "1" has a transition at the beginning and end of the bit and a "0" has an additional transition at the middle of the bit.

Figure 2:
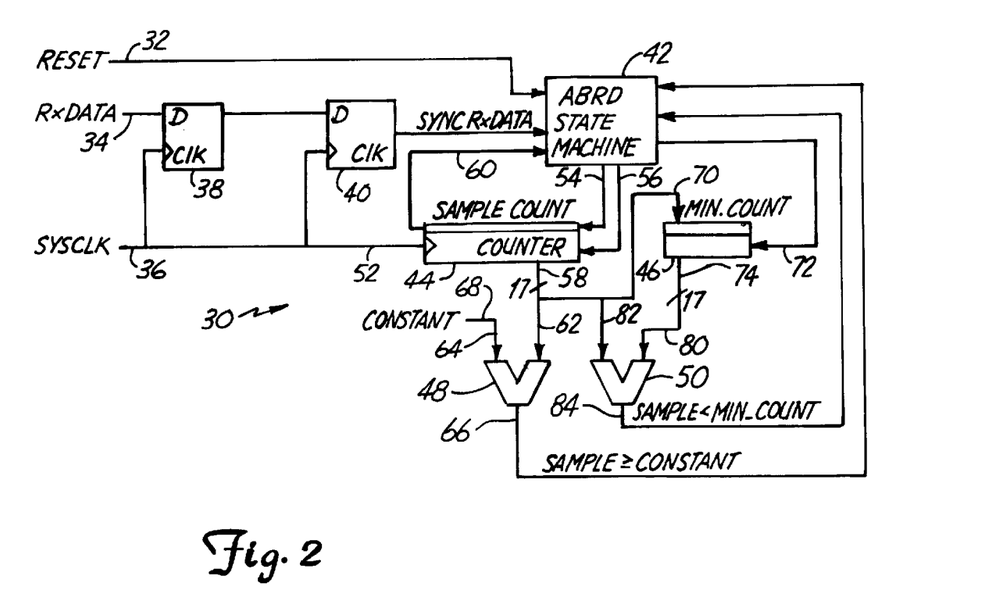
FIG. 2 is a block diagram of an automatic baud rate detector (ABRD) circuit according to one embodiment of the present invention.

FIG. 2 is a block diagram of an automatic baud rate detector circuit 30 according to one embodiment of the present invention. Circuit 30 includes reset input 32, serial input 34, system clock input 36, D flip-flops 38 and 40, automatic baud rate detector (ABRD) state machine circuit 42, sample counter 44, minimum count register 46, and comparators 48 and 50. Reset input 32 receives a reset signal, Reset, which resets ABRD state machine circuit 42 and sample counter 44 when active.

Serial input 34 receives the serial input data stream RxDATA. System clock input 36 receives a system clock signal, SysClk. D flip-flops 38 and 40 are coupled together in series between serial input 34 and ABRD state machine circuit 242 and are clocked by the system clock signal SysClk for synchronizing RxData to SysClk. The output of D flip-flop 40 provides a synchronized data signal SyncRxData to ABRD state machine circuit 42.

Sample counter 44 has a clock input 52, a reset input 54, an enable input 56, a sample count output 58 and a carry output 60. Clock input 52 is coupled to system clock 36. Reset input 54, enable input 56 and carry output 60 are coupled to ABRD state machine circuit 42. Sample count output 58 is coupled to comparators 48 and 50 and to minimum count register 46. Sample counter 44 increments a sample count on sample count output 58 in response to the system clock signal SysClk when ABRD state machine circuit 42 supplies an active count enable signal to enable input 56. Sample counter 44 generates a carry signal on carry output 60, which is active when the sample count on sample count output 58 overflows. Sample counter 44 resets the sample count when ABRD state machine circuit 42 supplies an active reset signal to reset input 54.

Comparator 48 includes inputs 62 and 64 and output 66. Input 62 is coupled to sample count output 58. Input 64 is coupled to a reference input 68. Output 66 is coupled to ABRD state machine circuit 42. A predetermined constant integer value is applied to reference input 68, which represents a baud rate that is beyond the maximum allowable baud rate of the input data stream RxDATA. Since a higher baud rate results in a smaller bit period and thus a smaller sample count, the predetermined constant value is set to a number that is smaller than any valid sample count based on the expected range of baud rates. Comparator 48 compares the sample count with the predetermined constant value and generates an output which indicates the sample count is at least as great as the predetermined constant value. Comparator 48 essentially acts as a high-pass filter which filters out "noise spikes" in the incoming data stream that result in small sample counts at the output of sample counter 44.

Minimum count register 46 stores a minimum count and includes data input 70, load enable input 72 and minimum count output 74. Data input 70 is coupled to sample count output 58. Enable input 72 is coupled to ABRD state machine circuit 42. Minimum count output 74 is coupled to comparator 50. Minimum count register 46 receives a load enable signal on load enable input 72 from ABRD state machine circuit 42. When the load enable signal is active, the sample count on sample count output 58 is loaded into minimum count register 46 and applied to minimum count output 74.

Comparator 50 includes inputs 80 and 82 and output 84. Input 80 is coupled to minimum count output 74. Input 82 is coupled to sample count output 58. Output 84 is coupled to ABRD state machine circuit 42. Comparator 50 compares the sample count on input 82 with the minimum count on input 80 and generates an output signal which indicates whether the sample count is less than the minimum count.

Figure 3:
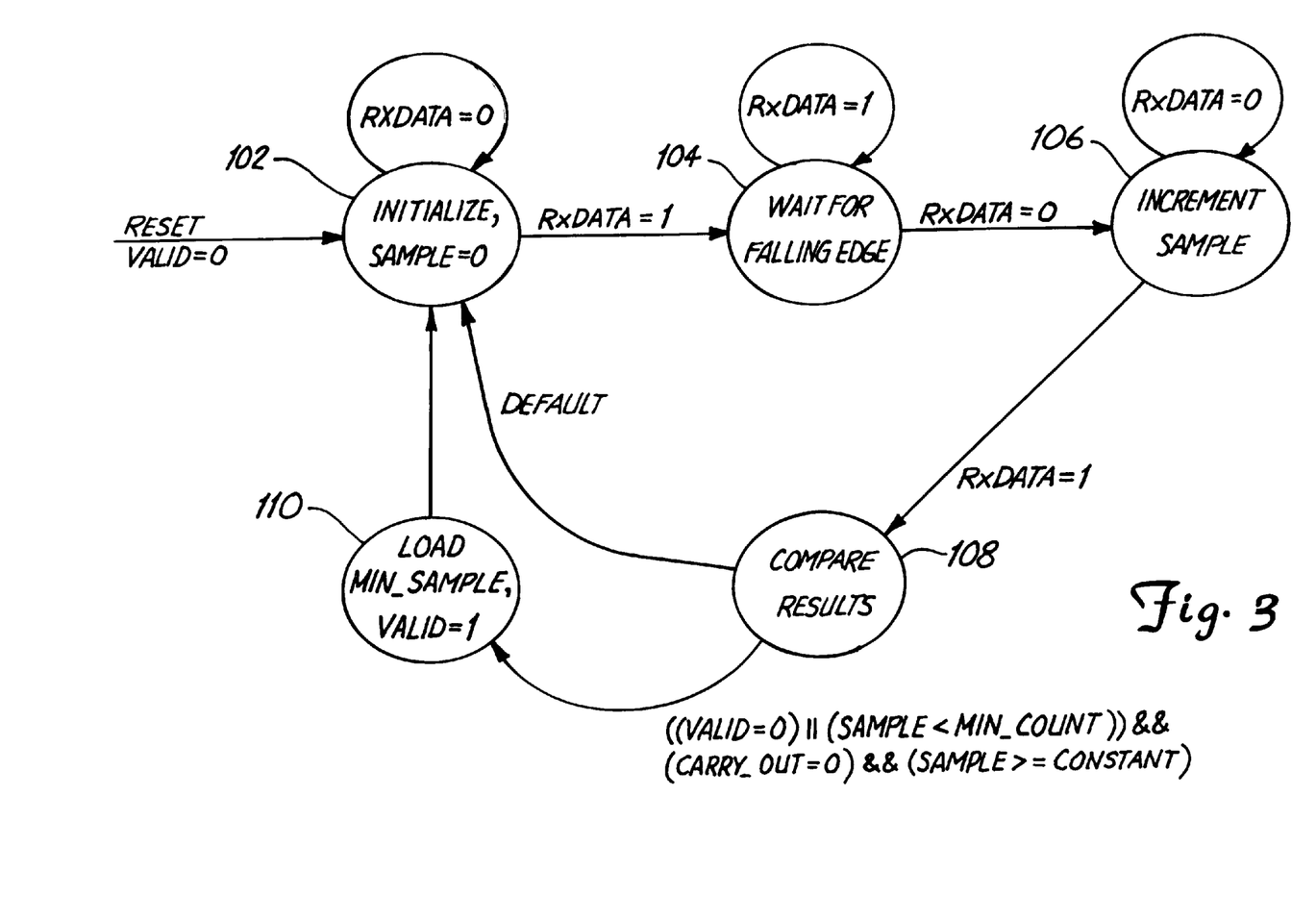
FIG. 3 is a state diagram illustrating the sequence of states of an ABRD state machine within the circuit shown in FIG. 2.

ABRD state machine circuit 42 is a synchronous hardware logic circuit having a sequence of states for controlling the various elements of circuit 30 to measure the time during which Rxdata is low during exactly one bit period. FIG. 3 is a state diagram illustrating the sequence of states of ABRD state machine 42. Upon start-up or a system reset, for example, a host processor or the serial controller with which the circuit is used activates a reset signal Reset, which resets a count valid flag maintained within ABRD state machine circuit 42. At state 102, circuit 42 initializes sample counter 44 by activating the reset signal supplied to reset input 54, and circuit 42 waits for the input data stream RxData to become a logic "1". When the input data stream Rxdata becomes a "1", circuit 42 moves from state 102 to state 104. At state 104, circuit 42 waits for the next falling edge of Rxdata, when Rxdata transitions from a "1" to a "0". At the falling edge of Rxdata, circuit 42 moves to state 106.

At state 106, circuit 42 has detected the falling edge of Rxdata and activates the count enable signal provided to enable input 56 of sample counter 44. Sample counter 44 begins incrementing the sample count on sample count output 58 up from zero in response to the system clock signal SysCLK. Counter 44 continues counting at state 106 until circuit 42 detects the next rising edge of RxData, when RxData transitions back to a logic "1".

When the rising edge is detected, circuit 42 moves to state 108 and deactivates the count enable signal supplied to enable input 56 of sample counter 44. Circuit 42 reads the count valid flag and the outputs of comparators 48 and 50. Circuit 42 activates the load enable signal supplied to load enable input 72, at state 110, if the count valid flag is reset, the carry signal generated on carry output 60 is inactive and comparator output 66 indicates the sample count is at least as great as the predetermined constant. Circuit 42 also activates the load enable signal, at step 110, if comparator output 84 indicates the sample count is less than the minimum count, the carry signal generated on carry output 60 is inactive and comparator output 66 indicates the sample count is at least as great as the predetermined constant. After activating the load enable signal circuit 42 sets the count valid flag and returns to state 102. If neither of the two conditions are satisfied at state 108, circuit 42 returns to state 102 without loading the sample count into minimum count register 46 or setting the count valid flag.

The automatic baud rate detection circuit 30 shown in FIG. 2 is monitored by a software routine which is executed on a host processor that is associated with the circuit. The software routine resets the ABRD state machine circuit 42 by activating reset signal Reset on reset input 32. The software routine then waits for a selected period of time. During this period of time, the host processor is free to execute software instructions for unrelated tasks or applications. After the selected period of time, the software routine reads the minimum count from minimum count register 46 and calculates the baud rate according to Equation 1.

Table 1 shows typical values that can be expected from automatic baud rate detection circuit 30.

TABLE 1

| Minimum Count Value (Dec) | Minimum Count Value (Hex) | System Clock Rate (MHz) | Measured Baud Rate |
| --- | --- | --- | --- |
| 41,666 | A2C2 | 50 | 1200.019 |
| 66,666 | 1046A | 80 | 1200.012 |
| 5208 | 1458 | 50 | 9600.614 |
| 8333 | 208D | 80 | 9600.384 |
| 2604 | A2C | 50 | 19201.229 |
| 4166 | 1046 | 80 | 19203.072 |
| 1302 | 516 | 50 | 38402.458 |
| 2083 | 823 | 80 | 38406.145 |
| 868 | 364 | 50 | 57603.687 |
| 1388 | 56C | 80 | 57636.888 |
| 434 | 1B2 | 80 | 115207.373 |
| 695 | 2B6 | 80 | 115107.913 |
| 111 | 6F | 50 | 450450.450 |
| 177 | B1 | 80 | 451977.401 |

Figure 4:
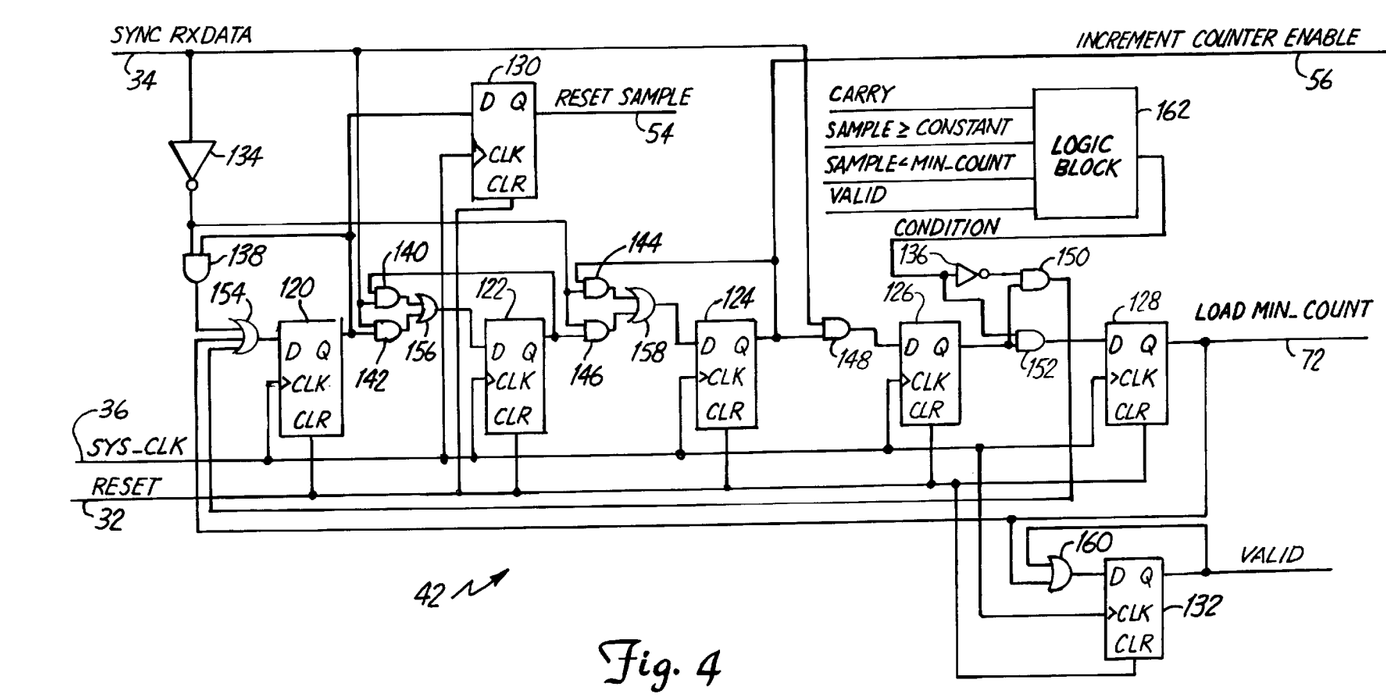
FIG. 4 is a simplified block diagram of the ABRD state machine.

FIG. 4 is a simplified block diagram of ABRD state machine circuit 42 according to one embodiment of the present invention. Many other circuit configurations can be used in alternative embodiments. Circuit 42 includes D-type flip-flops 120, 122, 124, 126, 128, 130 and 132, inverters 134 and 136, AND gates 138, 140, 142, 144, 146, 148, 150 and 152, OR gates 154, 156, 158 and 160 and logic circuit 162. Each flip-flop 120, 122, 124, 126, 128, 130 and 132 has a clock input CLK coupled to system clock input 36 and a clear input CLR coupled to reset input 32. Flip-flops 120, 122, 124, 126 and 128 correspond to states 102, 104, 106, 108 and 110 (shown in FIG. 3), respectively. When circuit 42 is in one of the states 102, 104, 106, 108 and 110, the output of the respective flip-flop 120, 122, 124, 126 and 128 is high.

For example, circuit 42 enters state 102 with the output of flip-flop 120 high when a high-to-low transition in the synchronized data signal SyncRxData is detected by AND gate 138. Circuit 42 also enters state 102 from state 110 after the output of flip-flop 128 goes high to assert the Load Min__Count enable signal, as detected by OR gate 154, or from state 108 after the output of flip-flop 126 goes high and CONDITION is not satisfied (i.e. low). CONDITION is generated by logic circuit 162, and is high when (1) VALID= high, CARRY=low (output 60 of sample counter 44) and Sample>=Constant (output 66 of comparator 48); or (2) Sample<MIN__COUNT (output 84 of comparator 50), CARRY=low, and Sample>=Constant.

When the synchronized data signal SyncRxData data goes high, as detected by AND gate 142, circuit 42 moves from state 102 to state 104, and the output of flip-flop 122 goes high. The output of flip-flop 122 stays high until the next falling edge of the synchronized data signal SyncRxData, which is detected by AND gate 146. The output of flip-flop 124 goes high as circuit 42 moves to state 106. This increments the sample count by enabling counter enable input 56 of sample counter 44. Circuit 42 continues to enable sample counter 44 until the synchronized data signal SyncRxData goes high again. The output of flip-flop 124 goes low, and the output of flip-flop 126 goes high as circuit 42 moves to state 108. With the output of flip-flop 126 high, if CONDITION is satisfied as detected by AND gate 152, the output of flip-flop 128 goes high and circuit 42 moves to state 110. If CONDITION is not satisfied, as detected by AND gate 150, circuit returns to state 102. At state 110, flip-flop 128 asserts load enable signal Load Min__Count on load enable input 72, and then circuit 42 returns to state 102. After passing through state 110, as detected by OR gate 160, the count valid flag on the output of flip-flop 132 goes high indicating the sample count in sample counter 44 is valid.

When returning to state 102, the output of flip-flop 120 goes high and causes the output of flip-flop 130 to go high, which sets the Reset Sample signal on reset output 54.

Figure 5:
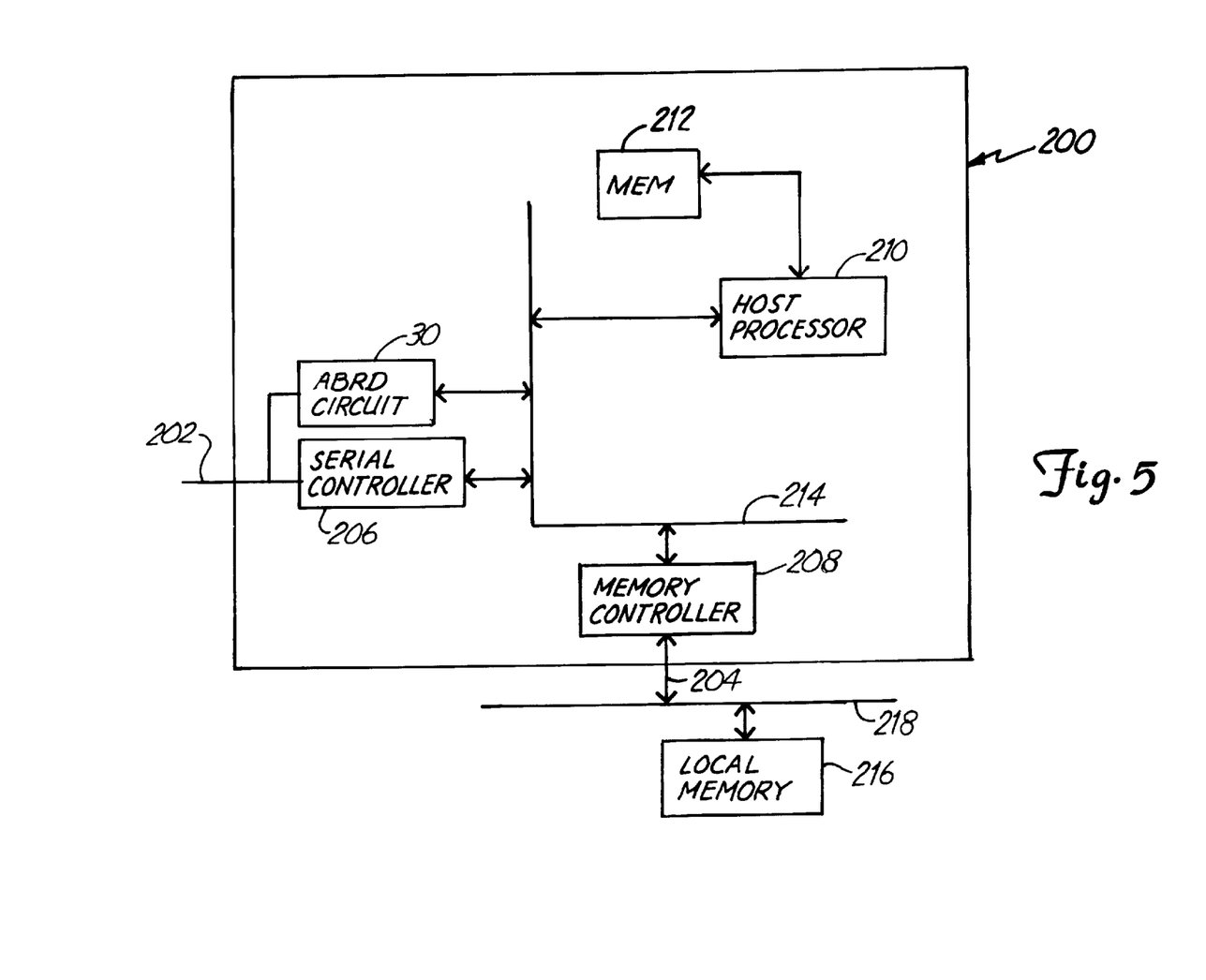
FIG. 5 is a simplified block diagram of an integrated circuit which includes the automatic baud rate detection circuit of the present invention.

FIG. 5 is a simplified block diagram of an example of an integrated circuit which includes a automatic baud rate detection circuit according to one embodiment of the present invention. Integrated circuit 200 includes serial port 202, local memory port 204, serial communications controller 206, ABRD circuit 30, local memory controller 208, host processor 210, internal memory 212 and internal transfer bus 214. Serial communications controller 206 and ABRD circuit 207 are coupled between serial port 202 and internal transfer bus 214. In one embodiment, serial communications controller 206 includes an Universal Asynchronous Receiver/Transmitter (UART) which is compatible with a 16550 UART manufactured by National Semiconductor Corporation and which has been modified to incorporate ABRD circuit 30.

Local memory controller 208 is coupled between local memory port 204 and internal transfer bus 214. Local memory 216 is coupled to local memory port 204 over memory bus 218. Host processor 210 is coupled to internal transfer bus 214 and to internal memory 212.

Host processor 210 can include a MIPS CW4011 MiniRISC™ Superscalar Processor Core designed and manufactured by LSI Logic Corporation, or another processor such as the Intel I960 Processor, the Motorola Power PC Processor or the ARM Processor manufactured by Texas Instruments, Incorporated. The software routine for resetting the ABRD state machine circuit, waiting a selected time, reading the minimum sample count and then calculating the baud rate is stored in internal memory 212, local memory 216 or in a resident instruction cache (not shown) which is associated with host processor 210. Host processor 210 reads the minimum count from minimum count register 46 within circuit 30 over internal transfer bus 214.

Once the baud rate has been calculated, host processor 210 can also load the minimum count into a baud rate count register for controlling a baud rate generator within serial communications controller 206. The value in the baud rate count register determines the baud rate that is generated for transmitting data through serial port 202. In one embodiment, the baud rate generator runs sixteen times faster than the baud rate. In this embodiment, host processor 210 shifts the minimum count value to the left by four bits, which multiplies the value by sixteen, and then stores the result in the baud rate count register.

In a preferred embodiment, the software routine that calculates the baud rate also maintains a look-up table in internal memory 212 or local memory 216. Entries in the look-up table are precise values of industry standard baud rates. After host processor 210 calculates the baud rate of the incoming data stream, the host processor compares the calculated baud rate to the entries in the look-up table and finds the entry that "best fits" the calculated baud rate, such as the closest entry. This entry is then provided as a baud rate output to serial communications controller 206. This minimizes errors in the baud rate calculation.

The automatic baud rate detector circuit of the present invention improves host processor efficiency since the host processor is relieved from much of the burden of determining the incoming data rate. These functions are now performed within the serial communications controller by the automatic baud rate detection circuit. Also, the automatic baud rate detection circuit of the present invention is capable of detecting much higher baud rates. For example, with a maximum baud rate error of about three percent, the circuit is capable of detecting incoming data rates of up to 1,500,000 baud using a 50 MHz system clock, or up to 2,398,081 baud using an 80 MHz system clock. The automatic baud rate detection circuit is preferably implemented in hardware. The hardware is straightforward to implement, simple to operate and does not consume a significant area on an integrated circuit. In one embodiment, the automatic baud rate detection circuit requires approximately 500 logic gates to implement.

Although the present invention has been described with reference to preferred embodiments, workers skilled in the art will recognize that changes may be made in form and detail without departing from the spirit and scope of the invention. For example, the automatic baud rate detection circuit can measure the time duration that the incoming serial data stream is high, rather than low, during exactly one bit period. Also, the circuit can be implemented in software rather than hardware if desired.

What is claimed is:

1. An automatic baud rate detector circuit comprising:

a serial input for receiving a serial data stream having a bit defined by a first transition from a first logic state to a second logic state and a second transition, which is the next subsequent transition, from the second logic state to the first logic state;

a counter which increments a sample count in response to a clock signal when a count enable signal supplied to the counter is active;

a register coupled to the counter, which stores the sample count as a minimum count when a load enable signal supplied to the counter is active, wherein the minimum count is representative of a baud rate of the serial data stream;

a first comparator coupled to the counter and the register and generating a first compare signal which indicates whether the sample count is less than the minimum count; and a state machine circuit which is coupled to the serial input for receiving the serial data stream and which supplies the count enable signal to the counter and the load enable signal to the register, wherein the state machine circuit activates the count enable signal from the first transition to the second transition in the serial data stream and activates the load enable signal when the first compare signal indicates the sample count is less than the minimum count.

2. The automatic baud rate detector circuit of claim 1 wherein the state machine circuit comprises a synchronous logic circuit having a sequence of states, including a) supplying a counter reset signal to the counter that initializes the sample count, b) waiting for the first transition from the first logic state to the second logic state, c) activating the count enable signal when the first transition is detected, d) waiting for the second transition from the second logic state to the first logic state, e) deactivating the count enable signal when the second transition is detected, f) receiving the first compare signal from the first comparator, and g) activating the load enable signal if the first compare signal indicates the sample count is less than the minimum count, and wherein the state machine circuit then returns to the state of a) supplying the counter reset signal to the counter.

3. The automatic baud rate detector circuit of claim 1 wherein the state machine circuit maintains a count valid flag, receives a detector reset signal and resets the count enable flag upon receipt of the detector reset signal, and wherein the state machine circuit activates the load enable signal if the sample count is less than the minimum count or if the count valid flag is reset and sets the count valid flag after activating the load enable signal.

4. The automatic baud rate detector circuit of claim 1 wherein the counter generates a carry signal which is active when the counter overflows, and wherein the state machine circuit activates the load enable signal only if the sample count is less than the minimum count and the carry signal is inactive.

5. The automatic baud rate detector circuit of claim 1 and further comprising a second comparator coupled to the counter, which compares the sample count to a predetermined constant and supplies a second compare signal to the state machine which indicates whether the sample count is at least as great as the predetermined constant, and wherein state machine circuit activates the load enable signal only if the sample count is less than the minimum count and is at least as great as the predetermined constant.

6. The automatic baud rate detector circuit of claim 5 wherein the predetermined constant corresponds to a baud rate that is greater than a maximum allowable baud rate.

7. A method of detecting baud rate, the method comprising:
receiving a serial data stream having a bit defined by a first transition from a first logic state to a second logic state and a second transition, which is the next subsequent transition, from the second logic state to the first logic state;
receiving a clock signal having a plurality of cycles, each cycle having a clock period;
counting a number of the clock cycles received between the first transition and the second transition; and
calculating a baud rate of the serial data stream based on the number of counted clock cycles and the clock period.

8. The method of claim 7 wherein the step of counting comprises:
maintaining a minimum count;
initializing a counter, wherein the counter increments a sample count in response to the clock signal when the counter is enabled;
detecting the first transition;
enabling the counter after detecting the first transition;
detecting the second transition;
reading the sample count from the counter after detecting the second transition;
comparing the sample count with the minimum count;
replacing the minimum count with the sample count if the sample count is less than the minimum count; and
repeating the steps of initializing, detecting the first transition, enabling, detecting the second transition, reading, comparing and replacing.

9. The method of claim 8 wherein the step of counting further comprises:
receiving a reset signal having an active state and an inactive state;
maintaining a count valid flag;
resetting the count valid flag when the reset signal is active;
replacing the minimum count with the sample count if the sample count is less than the minimum count or if the count valid flag is reset; and
setting the count valid flag when the minimum count is replaced with the sample count.

10. The method of claim 8 wherein the counter generates a carry signal which is active when the sample count overflows and wherein the step of counting further comprises:
replacing the minimum count with the sample count only if the sample count is less than the minimum count and the carry signal is inactive.

11. The method of claim 8 wherein the step of counting further comprises:
comparing the sample count with a predetermined constant; and
replacing the minimum count with the sample count only if the sample count is less than the minimum count and is at least as great as the predetermined constant.

12. The method of claim 11 wherein the step of comparing the sample count with a predetermined constant comprises comparing the sample count to a predetermined constant which corresponds to a baud rate that is greater than a maximum allowable baud rate.

13. The method of claim 8 wherein:
the step of detecting the first transition comprises detecting a transition in the serial data stream from a logic high state to a logic low state; and
the step of detecting the second transition comprises detecting the next subsequent transition in the serial data stream from the logic low state to the logic low state.

14. The method of claim 7 and further comprising:
maintaining a table of predetermined baud rates;
comparing the calculated baud rate with the predetermined baud rates; and
providing a baud rate output which corresponds to the predetermined baud rate that is closest to the calculated baud rate.

15. The method of claim 7 wherein:
the step of receiving comprises receiving a plurality of bits;
the step of counting comprises counting a number of the clock cycles received between the first transition and the second transition for each of the plurality of bits and selecting a lowest of the numbers of counted clock cycles for the plurality of bits; and
the step of calculating comprises calculating the baud rate based on the lowest number of counted clock cycles.

16. An integrated circuit comprising:
an internal bus;
a serial port for receiving a serial data stream having a bit defined by a first transition from a logic high state to a logic low state and a second transition, which is the next subsequent transition, from the logic low state to the logic high state;
a host processor coupled to the internal transfer bus;
a clock generator which generates a clock signal;
a synchronous serial communications controller coupled to the clock generator and between the internal bus and the serial interface port, the controller comprising:
means for detecting the first transition, activating a count enable signal after detecting the first transition, detecting the second transition and then deactivating the count enable signal after detecting the second transition;
means for incrementing a sample count based on the clock signal when the count enable signal is active;

means for storing a minimum count which is readable by the host processor over the internal bus;

means for comparing the sample count with the minimum count; and means for replacing the minimum count with the sample count if the sample count is less than the minimum count; and wherein the host processor comprises means for calculating a baud rate of the serial data stream based on the minimum count and the clock signal.

17. The integrated circuit of claim 16 wherein the controller comprises a Universal Asynchronous Receiver/Transmitter (UART).

* * * * *